(12) United States Patent  (10) Patent No.: US 7,349,008 B2
Rui et al.  (45) Date of Patent: Mar. 25, 2008

(54) AUTOMATED CAMERA MANAGEMENT SYSTEM AND METHOD FOR CAPTURING PRESENTATIONS USING VIDEOGRAPHY RULES

(75) Inventors: Yong Rui, Sammamish, WA (US); Anoop Gupta, Woodinville, WA (US); Jonathan Thomas Grudin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 10/307,088

(22) Filed: Nov. 30, 2002

(65) Prior Publication Data

US 2004/0105004 A1    Jun. 3, 2004

(51) Int. Cl.
 *H04N 7/18* (2006.01)
(52) U.S. Cl. .................. 348/169; 348/170; 348/171
(58) Field of Classification Search ............. 348/14.08, 348/169–172, 722; 386/69; 715/723; *H04N 7/18*
See application file for complete search history.

(56) References Cited

U.S. PATENT DOCUMENTS

| | | | | |
|---|---|---|---|---|
| 5,613,032 A | * | 3/1997 | Cruz et al. ................ | 386/69 |
| 5,729,252 A | * | 3/1998 | Fraser ................... | 715/723 |
| 6,392,694 B1 | * | 5/2002 | Bianchi ................. | 348/169 |
| 6,452,612 B1 | * | 9/2002 | Holtz et al. .............. | 348/722 |
| 6,577,333 B2 | * | 6/2003 | Tai et al. ................ | 348/14.08 |
| 6,940,540 B2 | * | 9/2005 | Beal et al. ............... | 348/169 |

OTHER PUBLICATIONS

Liu et al, "Automating Camera Management for Lecture Room Environments", Sep. 21, 2000, 9 pages.*

Bianchi, M.H. AutoAuditorium: a Fully Automatic, Multi-Camera System to Televise Auditorium Presentations. AutoAuditorium System: Smart Spaces Conference Paper. Bellcore Applied Research, Morristown, NJ.

Brotherton, J.A. and G.D. Abowd. Rooms Take Note: Room Takes Notes! AAAI Proceedings Template. Graphics, Visualization, and Usability Center. College of Computing, Georgia Institute of Technology. Atlanta, GA.

Buxton, W., A. Sellen and M. Sheasby. (1997). Interfaces for multiparty videoconferencing. In K. Finn, A. Sellen & S. Wilber (Eds). Video Mediated communication. Hillsdale, N.J.: Erlbaum, 385-400.

(Continued)

*Primary Examiner*—Andy S. Rao
(74) *Attorney, Agent, or Firm*—Lyon & Harr, L.L.P.; Craig S. Fischer

(57) ABSTRACT

An automated camera management system and method for capturing presentations using videography rules. The system and method use technology components and aesthetic components represented by the videography rules to capture a presentation. In general, the automated camera management method captures a presentation using videography rules to determine camera positioning, camera movement, and switching or transition between cameras. The videography rules depend on the type of presentation room and the number of audio-visual camera units used to capture the presentation. The automated camera management system of the invention uses the above method to capture a presentation in a presentation room. The system includes a least one audio-visual (A-V) camera unit for capturing and tracking a subject based on vision or sound. The (A-V) camera unit includes any combination of the following components: (1) a pan-tilt-zoom (PTZ) camera; (2) a fixed camera; and (3) a microphone array.

38 Claims, 9 Drawing Sheets

OTHER PUBLICATIONS

Cruz, G. and R. Hill. Capturing and Playing Multimedia Events with STREAMS. Bellcore, Morristown, NJ.

Gleicher, M. and J. Masanz. Towards Virtual Videography. Proc of ACM Multimedia'00, LA, 2000.

Green, S., Salkind, N, & Akey, T., Using SPSS for Windows analyzing and understanding data ($2^{nd}$ edition), Prentice Hall, Upper Saddle river, NJ.

He, L-W., M.F. Cohen, and D.H. Salesin. The Virtual Cinematographer: A Paradigm for automatic Real-Time Camera control and Directing. Microsoft Research, Seattle, WA. Department of Computer science and Engineering, University of Washington.

He. L., J. Grudin, A. Gupta. Designing Presentations for On-Demand Viewing. Technical Report: MSR-TR-99-69. Sep. 1999. Microsoft Research, Redmond, WA.

Liu, Q., Y. Rui, A. Gupta and J.J. Cadiz. Automating Camera Management for Lecture Room Environments. CHI 2001, vol. No. 3, Issue 1.

Mukhopadhyay, S. and B. Smith. Passive Capture and structuring of Lectures. Department of Computer Science, Cornell University. Ithaca, NY.

Rui, Y., L. He, A. Gupta and Q. Liu. Building an Intelligent camera Management System. Proc of ACM 1997.

Wang, C. and M.S. Brandstein. A Hybrid Real-Time Face Tracking System. Submitted to ICASSP98, Nov. 1997.

Zhai, S., C. Morimoto, and S. Ihde. Manual and gaze Input Cascaded (MAGIC) Point. In PROC. CHI'99: ACM Conference on Human Factors in Computing Systems. 246-153, Pittsburgh, May 15-20, 1999.

* cited by examiner

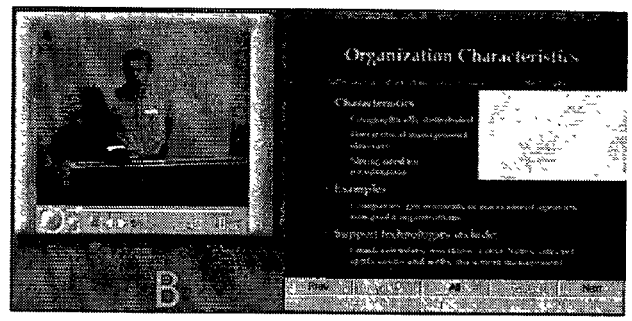

FIG. 9

| Survey questions | Profess evaluate system | Audience evaluate system | Audience evaluate profess. | p-value |
|---|---|---|---|---|
| 1. Shot change frequency | 2.5 (2.8) | 3.0 (2.6) | 4.0 (3.4) | 0.01 |
| 2. Framed shots well | 1.5 (1.8) | 3.0 (2.7) | 4.0 (3.6) | 0.02 |
| 3. Followed lecturer smoothly | 2.0 (2.0) | 2.0 (2.3) | 4.0 (3.5) | 0.01 |
| 4. Showed audience questioner | 3.5 (3.5) | 3.0 (2.8) | 2.0 (2.7) | 0.73 |
| 5. Showed audience reaction | 4.0 (3.5) | 2.0 (2.3) | 2.0 (2.3) | 1.00 |
| 6. Showed facial expression | 3.0 (2.8) | 2.5 (2.8) | 3.0 (3.2) | 0.23 |
| 7. Showed gestures | 3.5 (3.2) | 4.0 (3.2) | 4.0 (3.5) | 0.06 |
| 8. Showed what I wanted to watch | 3.0 (3.2) | 4.0 (3.4) | 4.0 (3.9) | >.05 |
| 9. Overall quality | 2.0 (2.0) | 3.0 (2.8) | 4.0 (3.8) | <.01 |
| 10. As compared with previous experience | 1.5 (1.5) | 3.0 (3.1) | 3.0 (3.6) | 0.11 |

TABLE 1

AUTOMATED CAMERA MANAGEMENT SYSTEM AND METHOD FOR CAPTURING PRESENTATIONS USING VIDEOGRAPHY RULES

TECHNICAL FIELD

The present invention relates in general to automated camera management and more particularly to a system and a method for capturing presentations using videography rules.

BACKGROUND OF THE INVENTION

A presentation (such as, for example, a meeting, a talk, a seminar, a lecture and classroom instruction) is an important tool whereby knowledge transfer, teaching and learning can occur. A presentation, which can be any setting whereby an exchange of information occurs, typically includes at least one lecturer and an audience. The audience may be present at the presentation or viewing the presentation at a remote location. In addition, the audience view the presentation in real time as it occurs ("live") or at a later time ("on demand"). In order to accommodate the constraints of people in both time and space, capturing presentations for both live and on-demand viewing is becoming increasingly popular in university and corporate settings.

In order to facilitate viewing of a presentation both live and on-demand, the presentation first must be captured. Once the presentation is captured, the presentation can be made available. For example, one popular way to view a presentation is by viewing over a computer network (or "online" viewing). Online viewing of a presentation enables a person to view the presentation at a time and location that is convenient for the person. Online viewing of presentations is becoming more feasible and popular due to continuous improvements in computer network infrastructure and streaming-media technologies.

There are at least two problems, however, associate with capturing presentations. Once problem is it is expensive to outfit lecture rooms with the equipment (such as cameras) needed to capture the presentation. Equipment cost is a one-time cost and tends to become less expensive as market demand increases. A second, and bigger problem is the high labor costs associated with having people capture the presentation. This labor cost is a recurring cost and one is of the main prohibitions to the capturing of presentations.

One way to breach this cost barrier is to build automated camera management systems, where little or no human intervention is needed. Even if a product of such a camera management system does not match the quality of professional videographers (who can still be used for the most important broadcasts), the camera management system allows the capture of presentations that otherwise would be available only to physically present audiences.

There are a few existing automated video systems and research prototypes. However, each of these systems has one or more of the following limitations:

Lack of a complete system: Some existing systems provide only isolated components, such as, for example, a head tracking module. These existing systems, however, lack many other components, and thus are not a complete system.

Use of invasive sensors to track lecturers: Some existing automated video systems require the use of obtrusive sensors to track the lecturer. These sensors must be worn by the lecturer and may be bothersome to the lecturer and interfere with the lecturer's freedom of movement.

Directing rules that work only in a specific situation: Some existing systems have a set of directing rules that are valid only in a specific configuration. For example, a set of directing rules may be specific to a large auditorium but fail in a small conference room. Or the directing rules may be specific to a certain number of cameras but fail if more cameras are added. One disadvantage of having these specific directing rules is that the system has little flexibility and general applicability.

In addition, various directing rules developed in the film industry and graphics avatar system currently are available. However, these systems are not suitable for use in automatically capturing presentations, in part for the following reasons. In the film industry or graphics avatar systems, a director has multiple physically and virtually movable cameras that can shoot a scene from almost any angle and direction. On the other hand, an automated video system is highly constrained by the flexibility of the types of camera shots. Therefore, many of the rules developed in the film industry cannot be used in automated video systems because of the highly-constrained nature of cameras in an automated video system.

Accordingly, there exists a need for an automated video system that alleviates human labor costs associated with capturing a presentation. At least two major components are needed in such a system:

1. A technology component: The hardware (cameras, microphones, and computers that control them) and software to track and frame presenters when they move around and point, and to detect and frame audience-members who ask questions.

2. An aesthetic component: The rules and idioms that human videographers follow to make the video visually engaging. Audiences have expectations based on viewing presentations captured by professional videographers. An automated video system should meet such expectations.

These components are inter-related. For example, aesthetic judgments will vary with the hardware and software available, and the resulting rules must in turn be represented in software and hardware. Further, what is needed is an automated video system and method that captures presentations in a professional and high-quality manner using the similar rules used by professional human directors and cinematographers. Moreover, what is needed is an automated video system and method that tracks a presenter in a presentation without the need for the presenter to wear bothersome and restricting sensors. What also is needed is an automated video system and method that is a complete system and can be used in a wide variety of situations based on the size of a room and the number of cameras available.

SUMMARY OF THE INVENTION

The invention disclosed herein includes a system and a method for automated camera management using videography rules to capture presentations. There are two interrelated components including a technology component and an aesthetic component. The technology component includes the hardware (such as video cameras) and the software (such as computer vision techniques used to track a presenter). The aesthetic components are represented by videography rules that human videographers follow to make a video visually engaging and interesting.

In general, the automated camera management method captures a presentation using videography rules to determine camera positioning, camera movement, and switching or transition between cameras. More specifically, the automated camera management method first determines a number of audio-visual camera units that will be used to capture the presentations. In addition, the method determines the type of presentation room in which the presentation is occurring. Once these two variables are determines, the videography rules that apply to the particular situation are employed. Based on these applicable videography rules, the capture of the presentation is managed. The videography rules depend on the type of presentation room and the number of audio-visual camera units used to capture the presentation. These rules may be obtained through interviews with professional human videographers or may be obtained heuristically.

The automated camera management system of the invention uses the above method to capture a presentation in a presentation room. The system includes a least one audio-visual (A-V) camera unit for capturing and tracking a subject based on vision or sound. The (A-V) camera unit includes any combination of the following components: (1) a pan-tilt-zoom (PTZ) camera; (2) a fixed camera; and (3) two or more microphones, also known as a microphone array. The PTZ camera can be a presenter-tracking camera and an audience-tracking camera, while the fixed camera can be an overview camera. In addition, the tracking camera can include the microphone array to provide sound source localization (SSL) tracking.

The A-V camera unit is capable of performing sound source localization, presenter-tracking and audience tracking when the microphone array is included. One configuration of the A-V camera unit is to have a PTZ camera on the bottom and a fixed camera on the top. Typically, the fixed camera has a wide-angle field-of-view to serve as an overview camera. The microphone array can be attached to the camera unit such that the camera unit can track someone who is speaking. Tracking of a subject is performed using an anticipatory presenter tracker that uses the history of a presenter's activity to anticipate future locations for a subject and frames the subject accordingly. Once the camera framing is determined and set, it is fixed to reduce any distracting and unnecessary camera movements.

The automated camera management system also includes a virtual director module for selecting and determining which of the multiple cameras is an active camera. Virtual cameramen report a camera status to the virtual director module. The virtual director module has two components: an event generator that generates a triggering event which initiates switching (or transitioning) from one camera to another, and a finite state machine (FSM) to decide to which camera to switch. Based on each reported status, the virtual director uses probabilistic rules and the applicable videography rules to determine the active camera. The virtual director determines the active camera by deciding how long a camera should be used, when the active camera should be changed and which camera should be the new active camera.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout:

FIG. 9 illustrates an embodiment of the remote audience graphical user interface shown in FIG. 4 and used in the working example.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The invention disclosed herein includes an automated camera management system and method for capturing presentations. The system and method are modeled after a professional human video production team. The system of the present invention includes an audio-visual (A-V) camera unit having one or more cameras for capturing a presentation, a virtual director, and may include one or more virtual cameramen. A virtual cameraman can be assigned to an A-V camera unit and is used to control the camera in capturing the presentation by tracking a subject (such as a presenter). The virtual director receives data from the virtual cameraman and determines how to switch among a multiple camera views. The captured presentation then is encoded for both live broadcasting and on-demand viewing. Both the virtual cameraman and the virtual director are controlled in accordance with a rich set of videography rules. As explained in detail below, these videography rules provide a framework whereby the virtual cameraman and the virtual director can emulate a professional human video production team.

Figure 1:
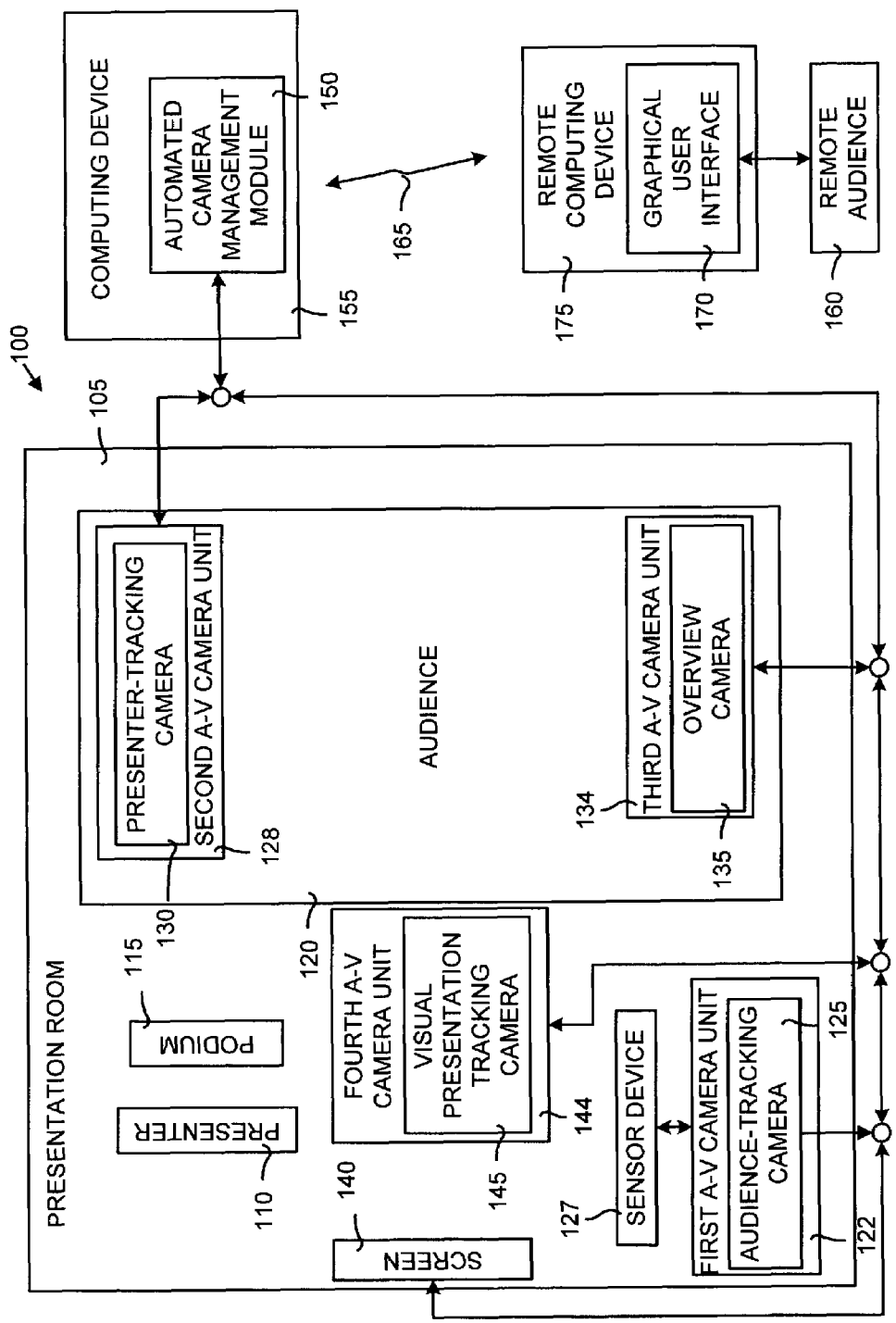
FIG. 1 is an overall block diagram illustrating an implementation of the automated camera management system for capturing a presentation and is provided for illustrative purposes only.

FIG. 1 is an overall block diagram illustrating an implementation of the automated camera management system 100 for capturing a presentation and is provided for illustrative purposes only. It should be noted that the automated camera management system 100 shown in FIG. 1 is only one example of numerous ways in which the invention may be implemented. In general, the automated camera management system 100 captures the presentation using at least one A-V camera unit. The A-V camera units are managed according to videography rules.

More specifically, a presentation is presented in a presentation room 105 by a presenter 110. The presenter 110 typically uses a podium 115 within the presentation room 105 for holding aids such as notes and a microphone (not shown). The presentation room 105 also typically includes an area for an audience 120 to view the lecture.

In the implementation shown in FIG. 1, the capture of the lecture is achieved using a plurality of A-V camera units and a plurality of virtual cameramen that are used to control some of the cameras within the A-V camera unit. The plurality of A-V camera units are positioned around the lecture room 105 such that views from each of the A-V camera units differ significantly from each other. As shown in FIG. 1, the automated camera management system 100 includes a first A-V camera unit 122 having an audience-tracking camera 125 that is positioned in the presentation room 105 to capture a camera view of members of the audience 120. Moreover, as explained in detail below, the audience-tracking camera 125 uses a sensor device 127 (such as a microphone array) to track specific members of the audience 120, such as those audience members asking questions. A second A-V camera unit 128 includes a presenter-tracking camera 130 and is positioned in the presentation room 105 to capture camera views of the presenter 110. As explained in detail below, the presenter-tracking camera 130 of the present invention does not require that the presenter 110 wear any tracking equipment (such as an infrared (IR) emitter or magnetic emitter) so that the presenter 110 is not bothered by the need to wear the extra tracking equipment.

The system 100 also includes a third A-V camera unit 134 that includes an overview camera 135 that captures an overview of the presentation room 105. The overview camera 135 is also used as a backup camera, so that if one of the tracking cameras fails the camera view from the overview camera may be substituted. In this embodiment, the overview camera 135 is static, although other embodiments may dictate that the overview camera be able to move. In another embodiment, the third A-V camera unit 134 is not present. Instead, the second A-V camera unit 128 includes a fixed camera that is used as an overview camera.

As part of the presentation the presenter 110 may use sensory aids to augment the presentation. For example, as shown in FIG. 1 the presenter 110 may use slides projected onto a screen 140. These slides are captured using a fourth A-V camera unit 144 that includes a visual presentation tracking camera 145 that captures camera views of the visual presentations used in the presentation.

The automated camera management system 100 includes an automated camera management module 150 that includes virtual cameramen, a virtual director, and a mixer (all discussed in detail below) for controlling the capture of the presentation. As shown in FIG. 1, in this implementation the automated camera management system 100 resides on a single computing device 155. However, it should be noted that other implementations are possible, such as having each virtual cameraman and virtual director reside on separate computing devices. Moreover, even though FIG. 1 illustrates various virtual cameramen and the virtual director as separate modules, these modules may actually be resident on a single computer running different threads.

In this implementation, the screen 140, the first, second, third and fourth A-V camera units 122, 128, 134, 144 are connected to the automated camera management module 150 to facilitate camera control. The finished presentation video is presented to a remote audience 160 by transmission over a communication channel 165 (such as network). The remote audience 160 interfaces with the lecture video using a graphical user interface 170 residing on a remote computing device 175.

II. Exemplary Operating Environment

Figure 2:
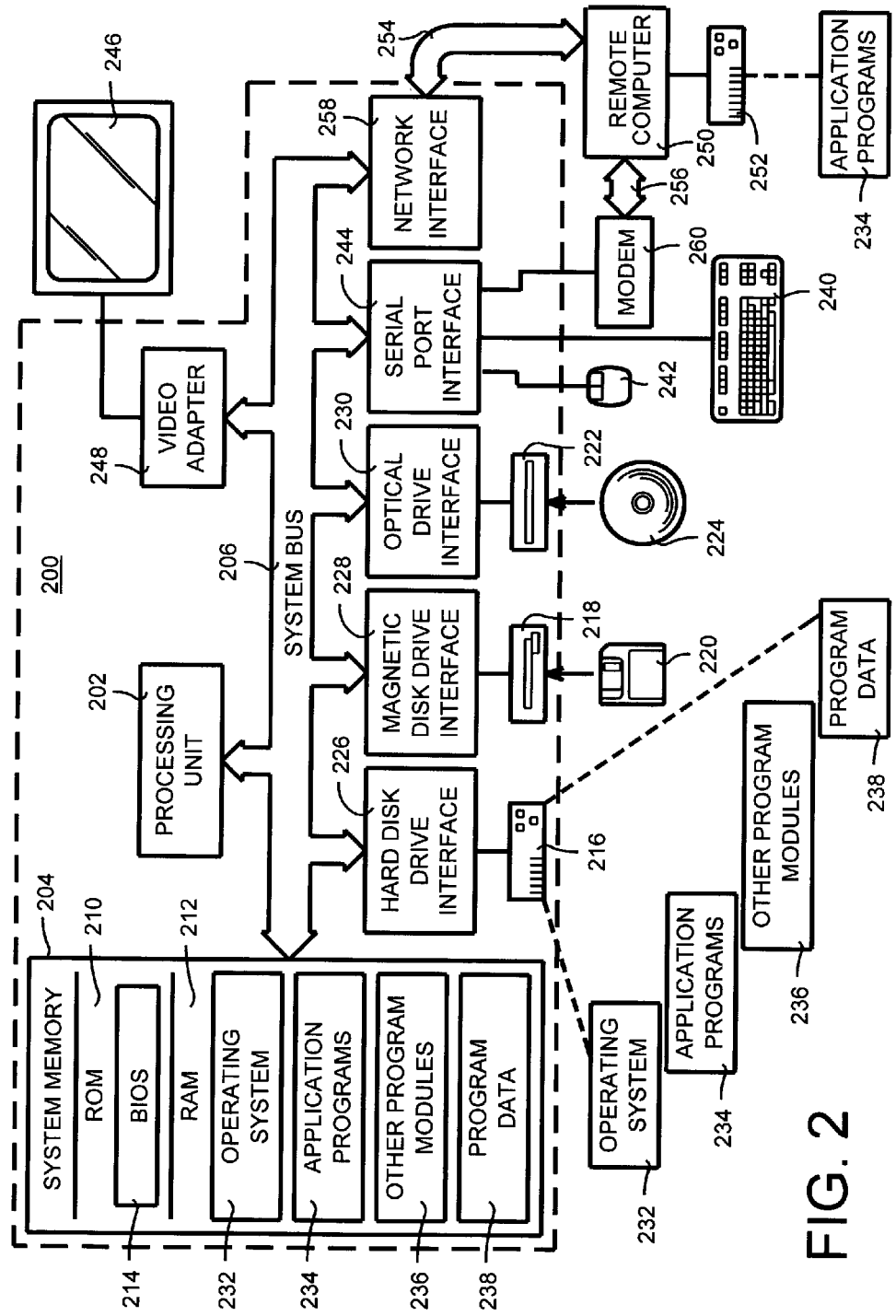
FIG. 2 is a general block diagram illustrating a computing device as shown in FIG. 1 that preferably may be used to carry out the invention.

The automated camera management system 100 is designed to operate in a computing environment. In a preferred embodiment, the computing device 155 and the remote computing device 175 are computers in a computing environment (such as a client/server networking environment). FIG. 2 is a general block diagram illustrating a computing device as shown in FIG. 1 that preferably may be used to carry out the invention. FIG. 2 and the following discussion are intended to provide a brief, general description of a suitable computing environment in which the automated camera management system and method of the invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

Referring to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a camera, a microphone, a joystick, a game pad, a satellite dish, a scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. System Overview

In order to capture a presentation in a high-quality manner, human operators need to perform many tasks including positioning cameras, moving cameras to track a moving presenter, and switching between cameras. It takes many years of training and experience for a human operator to efficiently perform these tasks. Consequently, high-quality videos are usually produced by a human video production team that includes a director and multiple virtual cameramen. Distributing the camera management tasks to different crewmembers makes capturing a presentation more efficient and smooth. This strategy is a good model reference for a computer-based automated video production system.

In general, the components of the present invention include an audio-visual (A-V) camera unit, a virtual cameraman and a virtual director. The A-V camera unit includes may be one or any combination of the following components: (1) a pan-tilt-zoom (PTZ) camera; (2) a fixed camera; and, (3) a microphone array having two or more microphones. An A-V camera unit is used to capture the presentation and, depending on the components present, may be a fixed camera, a moving camera, or a camera capable of tracking using the microphone array.

The virtual cameraman is connected to one or more A-V camera units and is used to control the camera views of each camera in the A-V camera unit. The virtual cameraman may be digital (such as a software module), analog, or may even be a human operator. The virtual director is a software module that receives the multiple camera views from each of the A-V camera units and determines which of these multiple camera views to use as current output.

Figure 3:
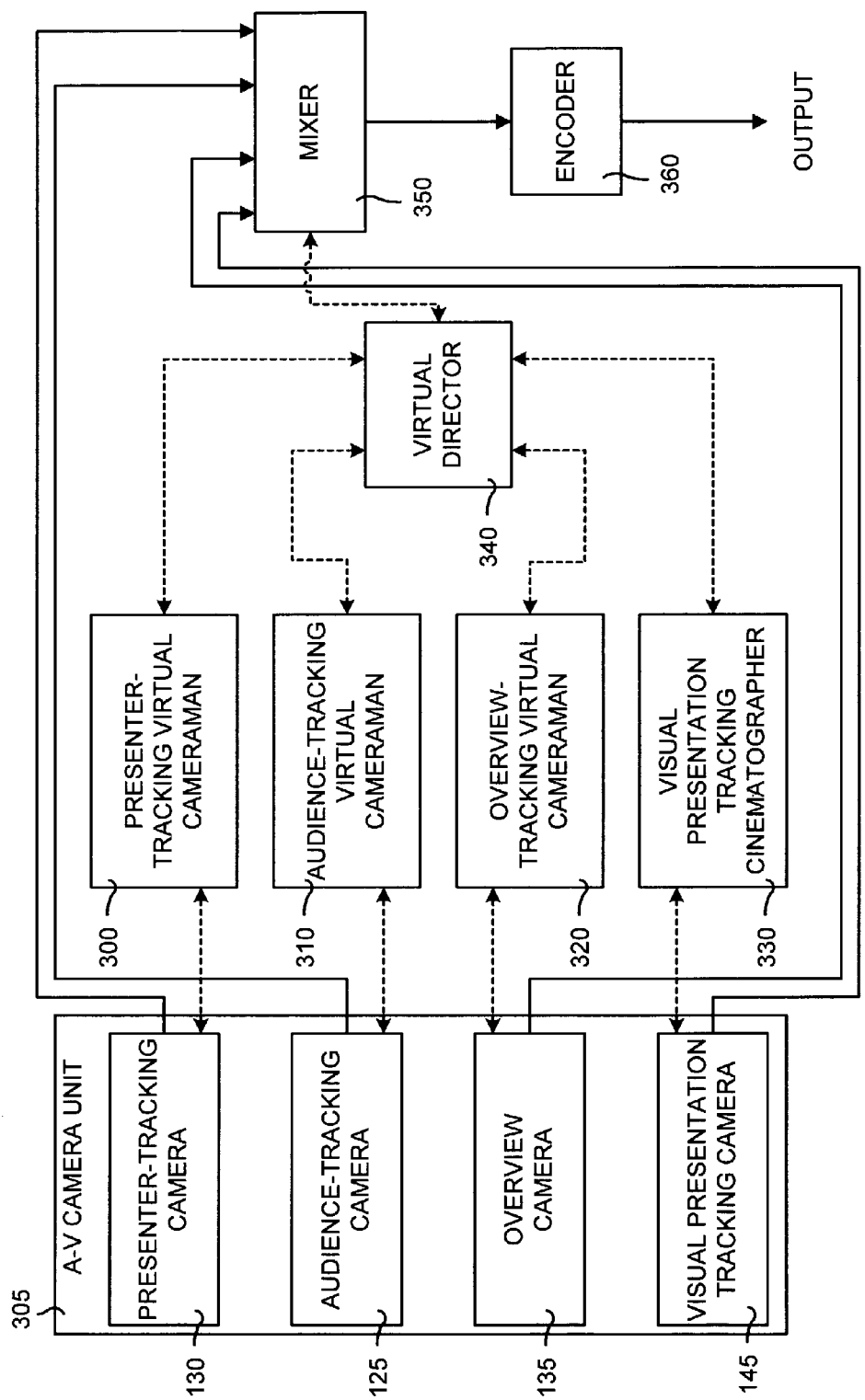
FIG. 3 is a general block/flow diagram illustrating the major components of the invention and their interaction.

FIG. 3 is a general block/flow diagram illustrating the major components of the present invention and their interaction. The solid lines indicate video data and the dashed lines indicate control signals and status signals. It should be noted that the automated camera management system 100 shown in FIG. 1 is a modular system and many of the components shown in FIG. 3 may be added to or subtracted from the system 100 as desired. Generally, which components are included and the number of those components included in the system depend on type of presentation room, as discussed in detail below.

As shown in FIG. 3 an A-V camera unit 305 may be used to capture a presentation. The A-V camera unit 305 may include a cameras such as a presenter-tracking camera 130 for tracking a presenter, an audience-tracking camera 125 for tracking audience members, an overview camera 135 for providing overview camera views of the presentation room, and a visual presentation tracking camera 145 for tracking any visual presentation (such as video or slides) used during the presentation. A plurality of virtual cameramen also are available to control each of the cameras within the A-V camera unit 305. Alternatively, a virtual cameraman can be used to control the entire A-V camera unit 305. These virtual cameramen include a presenter-tracking virtual cameraman 300, an audience-tracking virtual cameraman 310, an overview-tracking virtual cameraman 320 and a visual presentation tracking virtual cameraman 330. A virtual director 340 is used to manage the video output of each camera. A mixer 350 is controlled by the virtual director 340 and mixes together the video inputs from each of the cameras as directed by the virtual director 340. The mixer 350 may be an analog mixer or may be a digital mixer that includes a software module that performs the mixing functions. An encoder 360 encodes the final product and sends as output a video of the presentation.

The automated camera management system of the invention is modeled after a human video production team. This model includes using a two-level structure to simulate the roles performed by human cameramen and directors. At the lower level, the virtual cameramen are assigned to different cameras to perform basic video shooting tasks, such as tracking a lecturer or locating a talking audience member.

Figure 4:
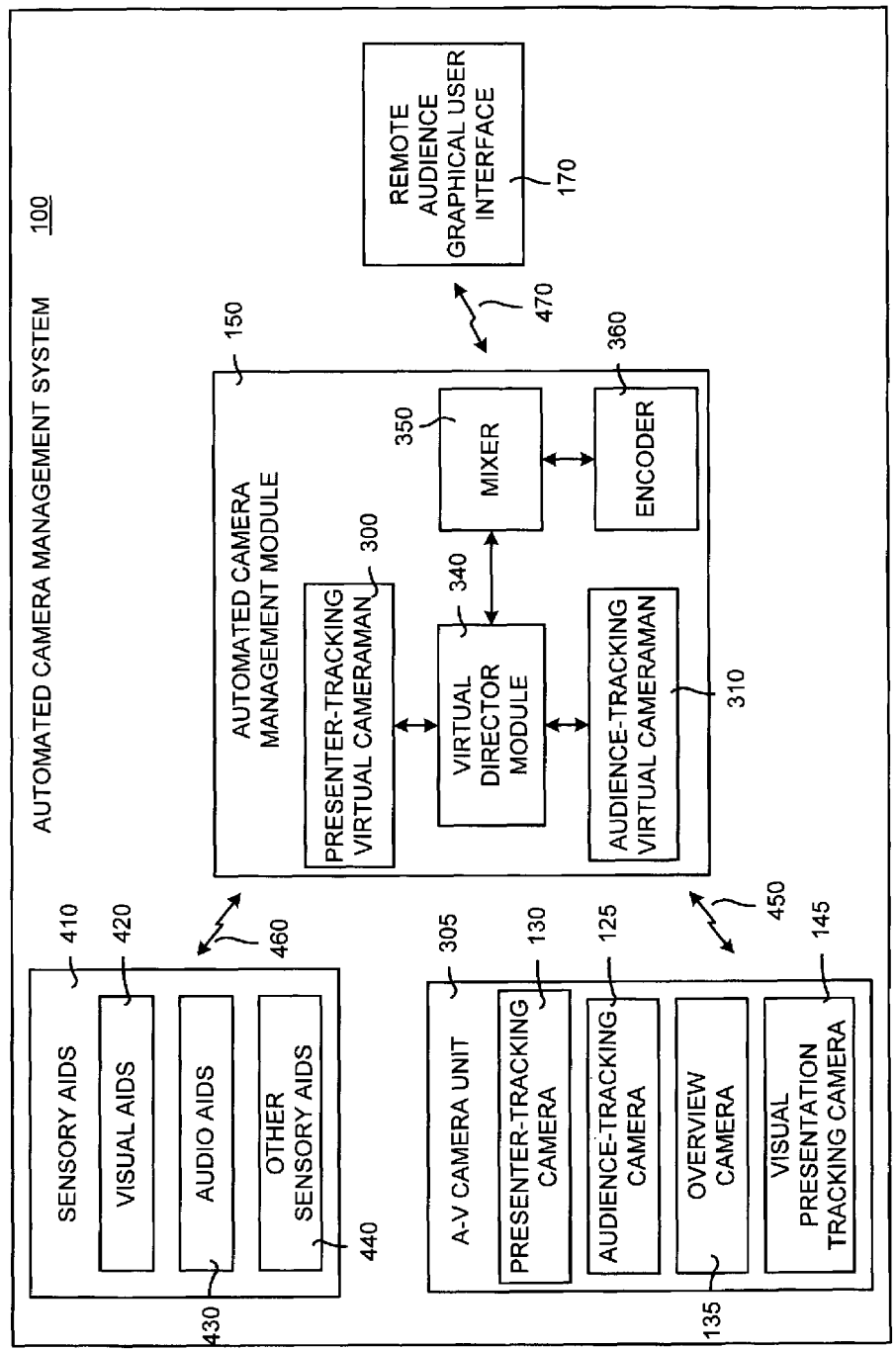
FIG. 4 is a general block diagram illustrating a preferred implementation of the major components of the invention.

FIG. 4 is a general block diagram illustrating an implementation of the major components of the present invention. The A-V camera unit 305 captures the presentation and provides multiple camera views of the presentation. As noted above, the A-V camera unit 305 may include a variety of component, including cameras. In particular, the A-V camera unit 305 may include the presenter-tracking camera 130 for tracking a presenter, the audience-tracking camera 125 for providing audience images and tracking desire audience members, the overview camera 135 for providing an overview of the presentation room, and the visual presentation tracking camera 145 for tracking and providing camera views of visual aids used the lecture.

In addition to using the A-V camera unit 305 to capture the presentation, the automated camera management system 100 may also capture any sensory aids 410 that are used during the presentation. These sensory aids 410 include visual aids 420, audio aids 430 (such as audio recordings), and other sensory aids 440 (such as motion pictures). These sensory aids 410 typically are used by a presenter during a presentation to make the presentation more interesting and to emphasize a particular point. The A-V camera unit 305 and the sensory aids 410 are in communication with the automated camera management module 150 through communication links 450, 460.

The automated camera management module 150 includes the presenter-tracking virtual cameraman 300 in communication with the presenter-tracking camera 130 that provides control of the presenter-tracking camera 130. Further, the automated camera management module 150 includes the audience-tracking virtual cameraman 310 in communication with the audience-tracking camera 125 that controls the audience-tracking camera 125. Also included in the automated camera management module 150 is a virtual director 340 for receiving input from the presenter-tracking cameraman 300, the audience-tracking virtual cameraman 310, the overview camera 135 and the visual presentation tracking camera 145. One function of the virtual director 340 is to choose an output camera view from the multiple camera views provided by the A-V camera unit 305. In addition, the virtual director 145 receives input from the sensory aids 410 (if they are being used) and determines how to incorporate them into the output camera view. For example, visual aids 410 such as slides may be incorporated into an output camera view to produce a final output view. The virtual director 340 controls the mixer 350 by instructing the mixer 350 which of the multiple camera views from the camera system 305 to use as the output camera view.

In general, data from the A-V camera unit 305 and sensory aids 410 are communicated to the mixer 350 and control signals from the virtual director 340 are communicated to the sensory aids 410, the overview camera 135, the visual presentation tracking camera 145 and the mixer 350. In addition, control signals are communicated between the virtual director 340, the presenter-tracking virtual cameraman 300 and the presenter-tracking camera 130 as well as the audience-tracking virtual cameraman 310 and the audience-tracking camera 125. The virtual director 340 then determines which of the multiple camera views from the A-V camera unit 305 to use as the output camera view. The selected camera view (along with any other data from the sensory aids 410) is sent from the mixer 350 to the encoder 360 for encoding. The encoded captured presentation is sent over a communication channel 470 for viewing by a remote audience. The remote audience views and interacts with the captured presentation using a remote audience graphical user interface 170.

IV. System Details

The automated camera management system 100 includes one or more virtual modules having a specific function. These virtual modules may be included or left out of the system 10 depending on the desired result and the type of presentation room where the presentation occurs. These virtual modules include the presenter-tracking virtual cameraman, for tracking and capturing the presenter and the audience-tracking virtual cameraman, for locating and capturing audience members. The virtual modules also include the visual presentation tracking virtual cameraman that captures and tracks (if necessary) any visual presentations accompanying the lecture and the overview virtual cameraman that captures the podium area and servers as a backup in case the other virtual cameramen are not ready or have failed. In addition, the virtual director selects the final output view from the A-V camera unit 305. The presenter-tracking virtual cameraman, audience-tracking virtual cameraman and the virtual director will now be discussed in detail.

Presenter-Tracking Virtual Cameraman

The presenter is a key object in the presentation. Accurately tracking and correctly framing the presenter therefore is of great importance. The presenter-tracking virtual cameraman follows the presenter's movement and gestures for a variety of camera views: close-up to focus on expression, median shots for gestures, and long shots for context.

One problem existing cameras that track a presenter is that the camera moves too often. Thus, the camera is continuously chasing a moving presenter. This can distract viewers. The presenter-tracking virtual cameraman alleviates this problem by using a history of the presenter's activity to anticipate future locations. Once the future locations are anticipated the presenter is framed accordingly. By way of example, assume a presenter has an "active" style and moves around a great deal. The presenter-tracking virtual cameraman handles this situation by zooming out to capture the presenter's entire activity area instead of continually chasing the presenter with a tight shot. This presenter framing strategy greatly reduces unnecessary camera movement.

Let $(x_t, y_t)$ be the location of the presenter estimated from the presenter-tracking camera. Before the virtual director cuts to the presenter-tracking camera at time t, the lecturer-tracking virtual cameraman will pan and tilt the camera such that it locks and focuses on location $(x_t, y_t)$. To determine the zoom level of the camera, the presenter-tracking virtual cameraman maintains the trajectory of presenter location in the past T seconds, $(X,Y)=\{(x_1,y_1), \ldots, (x_t,y_t), \ldots, (x_T,y_T)\}$. Currently, T is set to 10 seconds. The bounding box of the activity area in the past T seconds is then given by a rectangle $(X_L, Y_T, X_R, Y_B)$, where they are the left-most, top-most, right-most, and bottom-most points in the set $(X,Y)$. If it is assumed that the presenter's movement is piece-wise stationary, then $(X_L, Y_T, X_R, Y_B)$ can be used as a good estimate of where the presenter will be in the next T' seconds. The zoom level $Z_L$ is calculated as follows:

$$Z_L = \min\left(\frac{HFOV}{\angle(X_R, K_L)}, \frac{VFOV}{\angle(Y_B, Y_T)}\right) \quad (1)$$

where HFOV and VFOV are the horizontal and vertical field of views of the presenter-tracking camera, and $\angle(,)$ represents the angle spanned by the two arguments in the presenter-tracking camera's coordinate system.

Audience-Tracking Virtual Cameraman

Showing the audience members who are asking questions is important to make useful and interesting lecture videos. The present invention uses a sensing modality based on microphone arrays, where the audience-tracking virtual cameraman first estimates the sound source direction using the microphones and then uses the estimation to control the active camera. This technique is called a sound source localization (SSL) technique.

In general, three types of SSL techniques exist in the literature: (a) steered-beamformer-based; (b) high-resolution spectral-estimation-based; and (c) time-delay-of-arrival (TDOA) based. The first two types of techniques are computationally expensive and not suitable for real-time applications. The preferred technique is the TDOA-based techniques, where the measure in question is not the acoustic data received by the sensors, but rather the time delays between each sensor.

Within various TDOA approaches the generalized cross-correlation (GCC) approach is one of the most successful. Mathematically, the GCC approach may be described as follows. Let s(n) be the source signal, and $x_1(n)$ and $x_2(n)$ be the signals received by the two microphones:

$$x_1(n) = as(n-D) + h_1(n) * s(n) + n_1(n)$$

$$x_2(n) = bs(n) + h_2(n) * s(n) + n_2(n) \quad (2)$$

where D is the TDOA, a and b are signal attenuations, $n_1(n)$ and $n_2(n)$ are the additive noise, and $h_1(n)$ and $h_2(n)$ represent the reverberations. Assuming the signal and noise are uncorrelated, D can be estimated by finding the maximum GCC between $x_1(n)$ and $x_2(n)$:

$$D = \arg\max_\tau \hat{R}_{x_1 x_2}(\tau) \quad (3)$$

$$\hat{R}_{x_1 x_2}(\tau) = \frac{1}{2\pi} \int_{-\pi}^{\pi} W(\omega) G_{x_1 x_2}(\omega) e^{j\omega \tau} d\omega$$

where $\hat{R}_{x_1 x_2}(\tau)$ is the cross-correlation of $x_1(n)$ and $x_2(n)$, $G_{x_1 x_2}(\omega)$ is the Fourier transform of $\hat{R}_{x_1 x_2}(\tau)$, i.e., the cross power spectrum, and W(w) is the weighting function.

In practice, choosing the right weighting function is of great significance for achieving accurate and robust time delay estimation. As can be seen from equation (2), there are two types of noise in the system, namely, background noise $n_1(n)$ and $n_2(n)$ and reverberations $h_1(n)$ and $h_2(n)$. Previous research suggests that the maximum likelihood (ML) weighting function is robust to background noise and phase transformation (PHAT) weighting function is robust to room reverberation:

$$W_{ML}(\omega) = \frac{1}{|N(\omega)|^2} \quad (4)$$

$$W_{PHAT}(\omega) = \frac{1}{|G_{x_1 x_2}(\omega)|}$$

where $|N(w)|^2$ is the noise power spectrum.

The following is a discussion of a sophisticated hybrid weighting function that may be included in embodiments of the invention. From equation (4) it can be seen that the above two weighting functions are at two extremes. In other words, $W_{ML}(W)$ puts too much emphasis on "noiseless" frequencies, while $W_{PHAT}(W)$ completely treats all the frequencies equally. To simultaneously deal with background noise and reverberations, a technique has been developed as follows. Initially, $W_{ML}(W)$, which is the optimum solution in non-reverberation conditions is used. To incorporate reverberations, a generalized noise is defined as follows:

$$|N'(\omega)|^2 = |H(\omega)|^2 |S(\omega)|^2 + |N(\omega)|^2 \quad (5)$$

Assuming the reverberation energy is proportional to the signal energy, the following weighting functions are obtained:

$$W(\omega) = \frac{1}{\gamma |G_{x_1 x_2}(\omega)| + (1-\gamma)|N(\omega)|^2} \quad (6)$$

where $\gamma \in [0,1]$ is the proportion factor.

Figure 5:
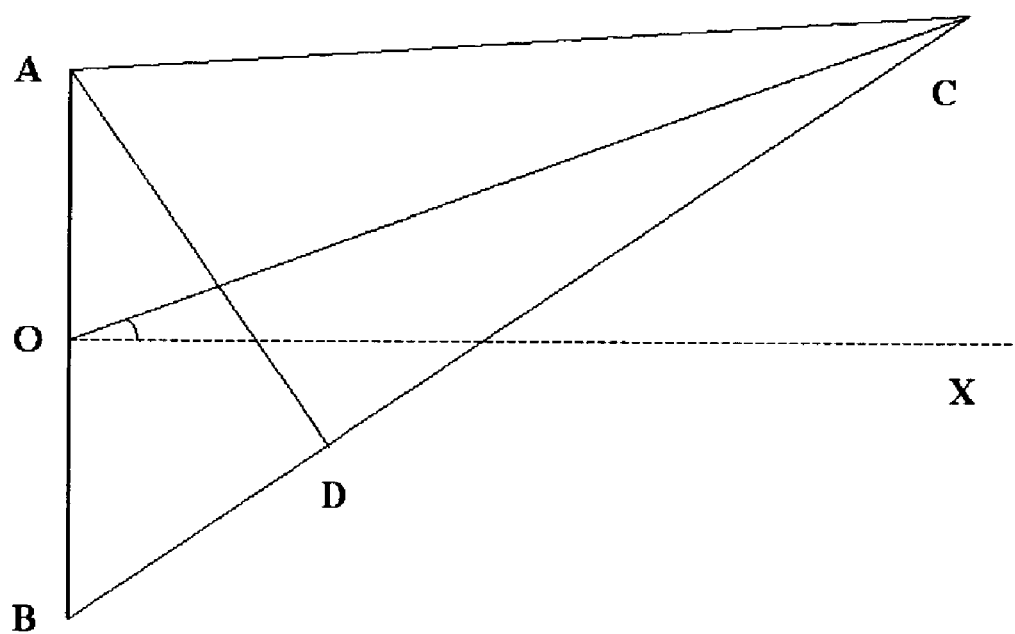
FIG. 5 is a geometric diagram illustrating the sound source localization technique of the present invention.

Once the time delay D is estimated from the above procedure, the sound source direction can be estimated given the microphone array's geometry. FIG. 5 is a geometric diagram illustrating the sound source localization technique of the present invention. As shown in FIG. 5, the two microphones are at locations A and B, where AB is called the baseline of the microphone array. Let the active camera be at location O, whose optical axis is perpendicular to AB. The goal of SSL is to estimate the angle $\angle COX$ such that the active camera can point at the right direction. When the distance of the target, i.e., |COX|, is much larger than the length of the baseline |AB|, the angle $\angle COX$ can be estimated as follows:

$$\angle COX \approx \angle BAD = \arcsin\frac{|BD|}{|AB|} = \arcsin\frac{D \times v}{|AB|} \quad (7)$$

where D is the time delay and v=342 m/s is the speed of sound traveling in air.

Virtual Director

The responsibility of the virtual director is to gather and analyze reports from different virtual cinematographers, to make intelligent decisions on which camera view to select as the output camera view, and to control the mixer to generate a final video output. Just like human video directors, a good virtual director observes the rules of cinematography and video editing in order to make the captured presentation more informative and entertaining. These videography rules are discussed in detail below.

Audio-Visual Camera Unit

The automated camera management system uses a variety of cameras and other components contained in one or more audio-visual (A-V) camera units. An A-V camera unit includes any combination of the following components: (1) a pan-tilt-zoom (PTZ) camera; (2) a fixed camera; and (3) two or more microphones, also known as a microphone array. The PTZ camera can be a presenter-tracking camera and an audience-tracking camera, while the fixed camera can be an overview camera. In addition, the tracking camera can include the microphone array to provide sound source localization (SSL) tracking.

The A-V camera unit is capable of performing sound source localization, presenter-tracking and audience tracking when the microphone array is included. One configuration of the A-V camera unit is to have a PTZ camera on the bottom and a fixed camera on the top. Typically, the fixed camera has a wide-angle field-of-view to serve as an overview camera. The microphone array can be attached to the camera unit such that the camera unit can track someone who is speaking and someone who is moving.

Several potential microphone arrays setups may be used to track someone who is speaking, such as is used in an audience-tracking camera tracking audience members. First, a microphone may be attached to the camera unit. Just like a human head has two ears the two microphones may be attached to the left and right sides of the camera unit. In this configuration, an estimate is made to determine whether the sound source is from left or from right, and there is no need to know the exact direction. This configuration, however, has two major problems in the presentation room context.

One problem is that the camera's width is not wide enough to be a good baseline for the microphone array. As can be seen from Equation (7), the SSL resolution is inversely proportional to the length of the baseline. A small baseline will result in poor resolution. A solution to this problem is to attach an extension structure to the camera unit and then attach the microphones to that structure to extend the microphone array's baseline. However, this solution leads to the second problem of this configuration, distraction. Local audience members do not want to see moving objects that may distract their attention. That is why in most presentation rooms the tracking cameras are hidden inside a dark dome. In this configuration, however, since the microphones are attached to the active camera, the whole tracking unit has to be outside the dome in order for the microphones to hear. By extending the baseline of the microphone array, we will increase the distraction factor as well. The distraction factor of such a setup makes it unusable in real presentation rooms.

An alternative solution is to have static microphones and a moving camera unit. In this configuration the microphone array is detached from the camera unit, but the microphone array's baseline is kept perpendicular to the camera's optical axis to ensure easy coordinate system transformation. By separating the microphones from the camera unit, we have a more flexible configuration. For example, the camera unit can be hidden inside a dark dome above the microphone array. In addition, because the microphone array is static, there can be a much larger baseline without causing any movement distraction. An example of a preferred baseline is 22.5 cm.

V. Videography Rules

The automated camera management system 100 is based on a set of videography rules. In general, these videography rules include camera positioning rules (such as where cameras should physically be located in a presentation room), movement rules that dictate how cameras should be moved and switching (or shot transition) rules that determine how and when switching from one camera to another should occur. Movement rules also include presenter tracking and framing rules, and audience tracking and framing rules. In general, the videography rules are dependent on the type of presentation room and the number of cameras used to capture the presentation. These videography rules can be obtained from experts in the videography field (such as professional videographers) or can be obtained heuristically.

In general, the videography rules used by the system 100 may be obtained from a variety of sources. By way of example, these rules may be obtained from a textbook, an interview with a video professional, a technical paper, or by observing the work of a video professional. A set of videography rules is generated by obtaining information from many sources (such as interviews with several video professionals) and including the most common rules within the set. If certain rules conflict they either can be excluded or the rules having the most weight can be included. By way of example, a rule may be considered to have more weight if the rule was from a video professional who has a great deal of experience or if the rule was obtained from a classic textbook on video production. These videography rules may also be implemented in a system whereby the set of videography rules may be expanded. This expansion may occur through the use of machine learning techniques (such as neural networks). Thus, the set of videography rules may be changed as the automated camera management system "learns" new rules.

One aspect of the invention uses videography rules based on interviews with the professional videographers (represented as A, B, C and D). The videography rules obtained are presented below.

Camera Positioning Rules

Each of the professionals interviewed ((represented as A, B, C and D) generally favored positioning cameras about two meters from the floor, close to eye level but high enough to avoid being blocked by people standing or walking. However, A and C felt that ceiling-mounted cameras, as used in our room, were acceptable as well. A also liked our podium-mounted audience-tracking camera. Each professional wanted audience-tracking cameras in the front of the room and presenter-tracking cameras in the back. However, with the podium toward one side of the room, two videographers (A and B) preferred direct face-on camera positioning and two (C and D) preferred positioning from an angle.

The videography rules for camera positioning may be summarized as follows:

Rule 1.1. Place cameras at the best angle to view the target. This view may be straight on or at a slight angle.

Rule 1.2 Presenter-tracking and overview cameras should be close to eye level but may be raised to avoid obstructions from audience.

Rule 1.3. Audience-tracking cameras should be high enough to allow framing of all audience area seating.

Two rules important in filming were also discussed:

Rule 1.4. A camera should avoid a view of another camera. This rule is essential in film, and it is distracting if a videographer is visible behind a camera. But a small camera attached to the podium or wall may not be distracting, and one in the ceiling can be completely out of view. Two of the videographers noted that they followed this rule, but the other two did not follow this rule. A in particular noted that our podium-mounted audience-tracking camera, although in range of the presenter-tracking camera, was unobtrusive.

Rule 1.5. Camera shots should avoid crossing a "the line of interest"—This line can be the line linking two people, the line a person is moving along, or the line a person is facing. For example, if a shot of a subject is taken from one side of the line, subsequent shots should be taken from the same side. It was noted by the professionals that Rule 1.5 did not apply in this setting because the cameras did not focus on the same subject.

Presenter Tracking and Framing Rules

The lecturer framing rules prescribe how to frame a lecturer. The lecturer is the most important object in a lecture. Thus, correctly framing the lecturer is of great importance. In this preferred embodiment, the rules for framing the lecturer state:

Rule 2.1. Keep a tight or medium head shot with proper space (half a head) above the head. The professional videographers all noted that presenters should be centered properly, with approximately ten to fifteen centimeters space above the presenter's head.

Rule 2.2. Center the presenter most of the time but give lead room for a presenter's gaze direction or head orientation. For example, when a presenter points or gestures, move the camera to balance the frame. A explicitly mentioned the "rule of thirds" and B emphasized "picture composition."

Rule 2.3. Track the presenter as smoothly as possible, so that for small presenter movements camera motion is almost unnoticed by remote audiences. As compared to our system the videographer professionals had tremendous ability to predict the extent to which the presenter was going to move and they panned the camera with butter-like smoothness.

Rule 2.4. Whether to track a presenter or to switch to a different shot depends on the context. For example, B said that if a presenter walked over quickly to point to a slide and then returned to the podium, he would transition to an overview shot and then back to a presenter shot. But if the presenter walked slowly over and seemed likely to remain near the slide, he would track the presenter.

Rule 2.5. If smooth tracking cannot be achieved, restrict the movement of the presenter-tracking camera to when a presenter moves outside a specified zone. Alternatively, the professionals suggested zooming out a little, so that smaller or no pans would be used. The presenter-framing strategy partly relies on this strategy.

Audience Tracking and Framing Rules

All videographer professionals agreed on the desirability of quickly showing an audience member who commented or asked a question if that person could be located in time. Beyond that they differed. At one extreme, B cut to an audience for comedic reactions or to show note-taking or attentive viewing. In contrast, D avoided audience reaction shots and favored returning to the presenter quickly after a question was posed. Thus, agreement was limited to the first two of these rules:

Rule 3.1. Promptly show audience questioners. If unable to locate the person, show a wide audience shot or remain with the presenter.

Rule 3.2. Do not show relatively empty audience shots.

Rule 3.3. Occasionally show local audience members for several seconds even if no one asks a question.

Videographer professional B, perhaps the most artistically inclined, endorsed rule 3.3. He favored occasional wide shots and slow panning shots of the audience—the duration of pans varied based on how many people were seated together. The other videographer professionals largely disagreed, arguing that the goal was to document the presentation, not the audience. However, A and C were not dogmatic: the former volunteered that he liked audience pan shots a lot, and the latter said he might have panned the audience on occasion if it were larger. The strongest position was that of D, who said of our system's occasional panning of the audience, "You changed the tire correctly, but it was not flat."

As noted in detail below, the automated camera management system was relatively highly rated on the audience shots by the remote viewers and even more highly rated by the professionals. For one thing, when the professionals were unfamiliar with the faces, voices, and habits of the audience, the system was faster in locating questioners.

Shot Transition (Switching) Rules

Some of the professional videographers thought the system maintained a good rate of shot change; others thought it changed shots too frequently. This is of course tied to rule 3.3, discussed above. Videographer professional D further noted that " . . . keep the shots mixed up so (viewers) can't totally predict . . . " All videographer professionals felt that there should be minimum and maximum durations for shots to avoid distracting or boring viewers, although in practice they allow quite long (up to a few minutes) medium-close shots of the presenter.

Rule 4.1. Maintain reasonably frequent shot changes, though avoid making the shot change sequences mechanical/predictable.

Rule 4.2. Each shot should be longer than a minimum duration, e.g., 3~5 seconds, to avoid distracting viewers.

Rule 4.3. The typical to maximum duration of a shot may vary quite a bit based on shot type. For instance, it can be up to a few minutes for presenter-tracking shots and up to 7-10 seconds for overview shots. For audience shots the durations mentioned are in the range 4-10 seconds for a static shot where no question is being asked, or the duration of the whole question if a question is being asked, and for panning shots the duration varies based on the number of people that the pan covers (slow enough so that viewers can see each audience's face).

Rule 4.4. Shot transitions should be motivated.

Rule 4.5. A good time for a shot change is when a presenter finishes a concept or thought or an audience member finishes a question.

Shot changes can be based on duration, e.g., rule 4.3, but more advanced shot changes are based on events. Unmotivated shot changes, as in a random switch from the presenter-tracking to the overview camera, can "give the impression that the director is bored." As indicated above, opinions differed some as to what can motivate a transition. Emergencies do motivate shifts to the overview camera, such as when the presenter-tracking camera loses track of the presenter, or the audience-tracking camera is being adjusted.

Interestingly, the overview camera not only can be used as a safety backup, it can also be used to capture gestures and slide content. In fact, B zoomed in the overview camera a little during the talk to cover the presenter and provide readable slides. In summary:

Rule 4.6. An overview shot is a good safety backup.

Rule 4.7. An overview shot can frame a presenter's gestures and capture useful information (e.g., slide content).

If the overview camera is a static camera, there is a tradeoff between rules 4.6 and 4.7. If the camera is too zoomed in, it will not serve as a safety backup; but if it is too zoomed out, the shot is less interesting and slides less readable.

Rule 4.8. Do not make jump cuts—when transitioning from one shot to another, the view and number of people should differ significantly. The system occasionally switched from a zoomed-out wide presenter view to a similar shot from the overview camera. That was an example of "jump cuts" and appeared jarring.

Rule 4.9. Use the overview camera to provide establishing and closing shots The professionals disagreed over the value of overview shots at the beginning and end of a lecture. Professional A explicitly avoided them and D explicitly endorsed them.

VI. Presentation Room Types

Figure 6A:
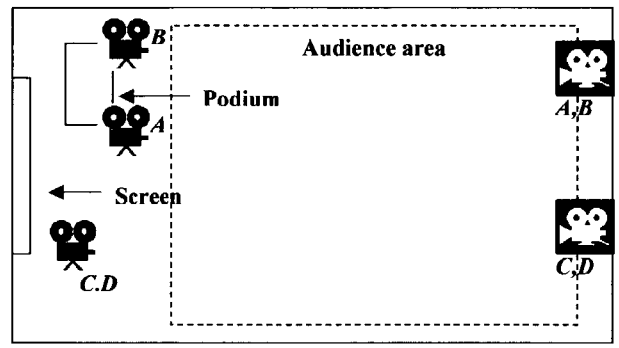
FIG. 6A is a block diagram illustrating a medium presentation room and the camera configuration for that type room.
Figure 6B:
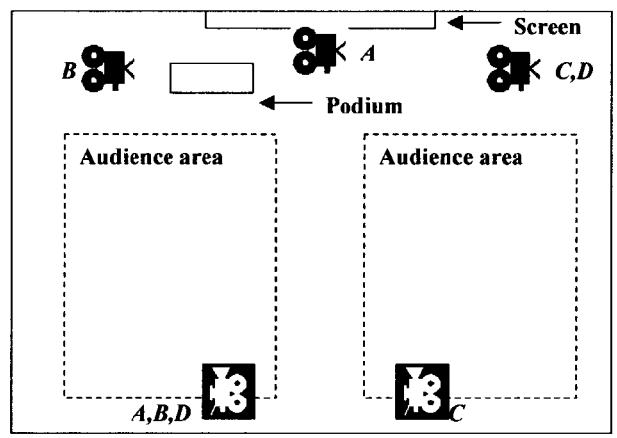
FIG. 6B is a block diagram illustrating a large presentation room and the camera configuration for that type room.
Figure 6C:
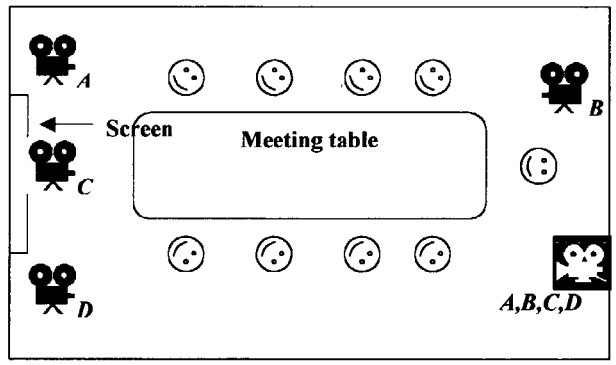
FIG. 6C is a block diagram illustrating a small presentation room and the camera configuration for that type room.

The automated camera management system is capable of being used in a variety of different presentation room types. For ease of discussion, presentation rooms are divided into three general types: (1) a medium presentation room; (2) a large presentation room; and (3) a small presentation room. The medium presentation room is typically a lecture room having a seating capacity of approximately 30 to 50 persons. As shown in FIG. 6A, the medium presentation room generally has a greater depth than width, with the presenter and audience oriented as shown. The large presentation room is typically an auditorium having a seating capacity of greater than approximately 100 persons. As shown in FIG. 6B, the large presentation room generally has a width that is greater than depth. The small presentation room is generally a conference room capable of seating up to approximately 20 persons and typically has a meeting or conference table. FIG. 6C illustrates a typical layout of a small presentation room.

The professional videographers were asked how the videography rules and camera positioning would change in these different presentation room types. For convenience, the presentation room types will be referred to as "R1" for the medium presentation room, "R2" for the large presentation room, and "R3" for the small presentation room. Three configurations of the A-V camera unit also were considered and denoted as follows: "C1"—an A-V camera unit having an overview camera and a presenter-tracking camera; "C2"—two A-V camera units. The first A-V camera unit as in C1 plus a second A-V camera unit having a visual presentation tracking camera; C3"—the C2 configuration plus a third A-V camera unit having an audience-tracking camera.

This leads to 9 combinations (R1-R3×C1-C3). For simplicity, R1C1 will be used to represent the case where the camera configuration C1 is used in the medium presentation room R1. Similarly, R3C3 means that camera configuration C3 is used in room type R3.

Camera Positioning

FIGS. 6A to 6C illustrate camera positions proposed by the professional videographers A, B, C, and D. It should be noted that in cases where the audience-tracking camera or visual presentation tracking camera was not present, the videographers did not suggest changing the position of the presenter-tracking and overview cameras. Thus, cases R1C3, R2C3 and R3C3 in FIGS. 6A to 6C can be used to illustrates all the 9 combinations. In FIGS. 6A to 6C the white cameras indicate A-V camera units containing presenter-tracking cameras and overview cameras and the black cameras indicate A-V camera units containing audience-tracking cameras. In addition, the letters adjacent the camera units indicate the different professional videographer's choices. The visual presentation tracking cameras are implicit.

The layout in FIG. 6A (R1C3) represents the camera configuration in the medium presentation room. In addition, this configuration is used in the working example given below. The professional videographers' assessment of this camera configuration was discussed in detail above with regard to the videography rules.

When the presentation room is a large presentation room (R2C3), such as shown in FIG. 6B, it was noted that because the presenter-tracking cameras were at a greater distance, they could be higher from the floor. When the presentation room is a small presentation room (R3C3), such as shown in FIG. 6C, the audience faces in different directions and the cameras are closer to both the presenter and the audience. This leads to more changes in the camera positioning. In particular, when needed, the A-V camera unit containing a presenter-tracking camera and an overview camera can also be used to show half of the audience. Professionals A and B placed the audience-tracking camera to view the other half of audience, and C mounted an A-V camera unit containing an overview camera on the ceiling to view the entire audience. Professional videographer D only captured half the audience face-on. D's placement avoided cameras viewing one another and eliminated some violations of "the line of interest" rule, as did B's interesting choice.

Shots and Transitions

The videography rules discussed above apply to the shots and transitions for configuration R1C3. Based on interviews with the professional videographers, it was found that most of the rules for configuration R1C3 may also be generalized to configurations R2C3 and R3C3. There was only one main exception corresponding to the small presentation room configuration (R3C3). This results because the audience-tracking camera often can only see half of the audience as discussed above. If an audience in such a blind zone was to ask a question, the professional videographers suggested two options. The first option was simply not to transition to the audience shot. The second option was if the presenter-tracking camera could have covered the shot then it could be used for that purpose, The overview camera could then be used as the transition. Then the professionals would follow the reversed sequence back, i.e. audience-→overview-→lecturer.

For all three of the presentation room types R1-R3, the rules for case C2 were similar to those in C3. However, because the audience camera was not available at all in C2, there were a few rule changes regarding the audience shots. One change was to simply ignore the audience shots. The other was to use the presenter-tracking camera to cover the audience when possible, and go through the following shot transition sequences: lecturer-→overview-→audience-→overview-→lecturer.

For all the three presentation rooms R1-R3, camera configuration C1 was the most challenging because the professional videographer had to rely on the single A-V camera unit containing a presenter-tracking camera and an overview camera to capture the presenter, the visual aids, and the audience. Using configuration C2 as a reference, the rule changes are the following, mostly on how to capture the visual aids (such as slides):

Adjust the position of the overview camera if possible to cover both visual aids and presenter more evenly. Use the presenter-tracking camera to capture the presenter, and switch to the overview camera at the transitions in the visual aids.

Use the presenter-tracking camera mostly to capture the presenter, and to capture the visual aids at transition points (such as where slides change). Switch to the overview camera when the presenter-tracking camera is adjusting between the presenter and the visual aids.

In summary, three findings make the generalization of the automated camera management system to different presentation room types possible. First, adding or deleting a camera normally will not affect the positioning of existing cameras. Second, for all the three presentation room types, R1-R3, to downgrade the camera configuration from C3 to C2 or C1, there are only a few well-defined rule changes. Third, the camera positioning and rules for the large presentation room (R2) and small presentation room (R3) are similar to those for the medium presentation room (R1).

VII. Operational Overview

Figure 7:
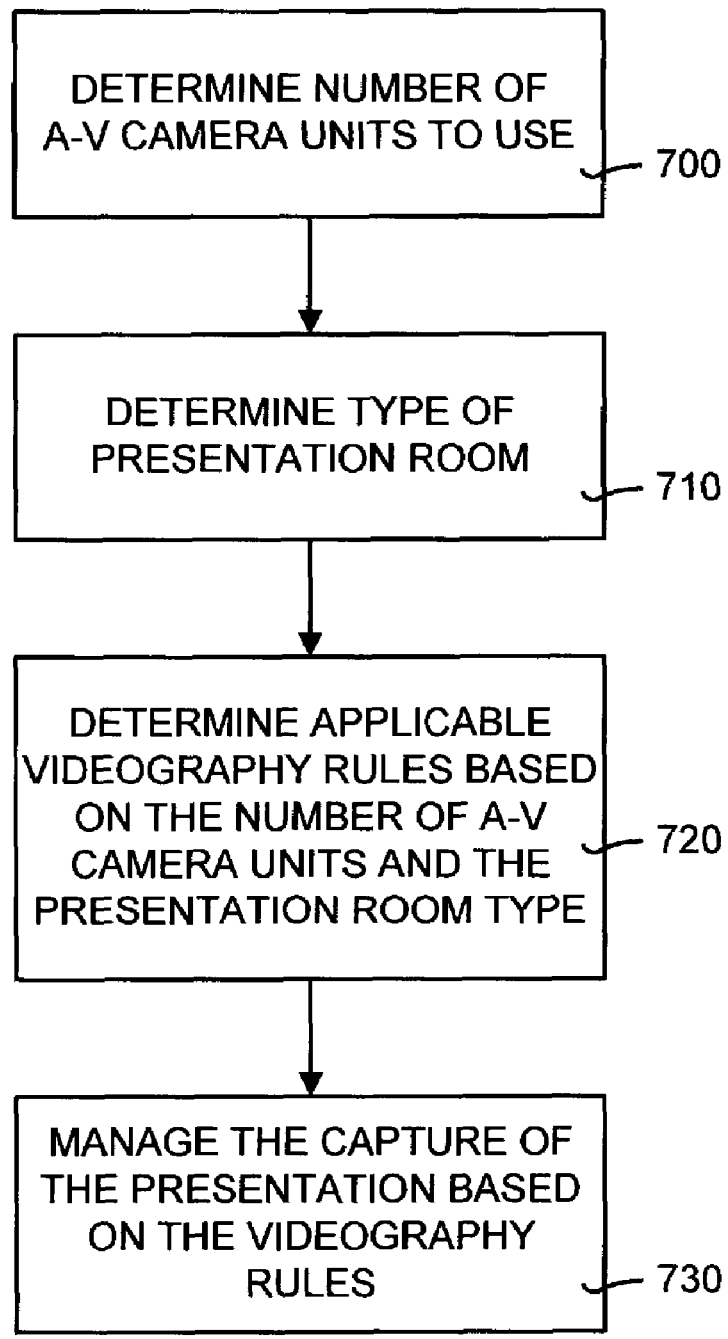
FIG. 7 is a flow diagram illustrating the operation of the invention.

The automated camera management method of the invention is used to capture a presentation using videography rules. FIG. 7 is a flow diagram illustrating the operation of the invention. In particular, the method begins by determining the number of audio-visual camera units that will be used to capture the presentation (box 700). In addition, the type of presentation room in which the presentation is occurring is determined (box 710). It should be noted that (box 700) and (box 710) may be performed simultaneously or in any order.

Once the number of A-V camera units and the presentation room type are determined, the applicable videography rules are determined (box 720). As explained above, the applicable videography rules depend on the number of A-V camera units and the type of presentation room. When the applicable videography rules are determined, then the correct videography rules are used to manage the capture of the presentation (box 730).

Figure 8:
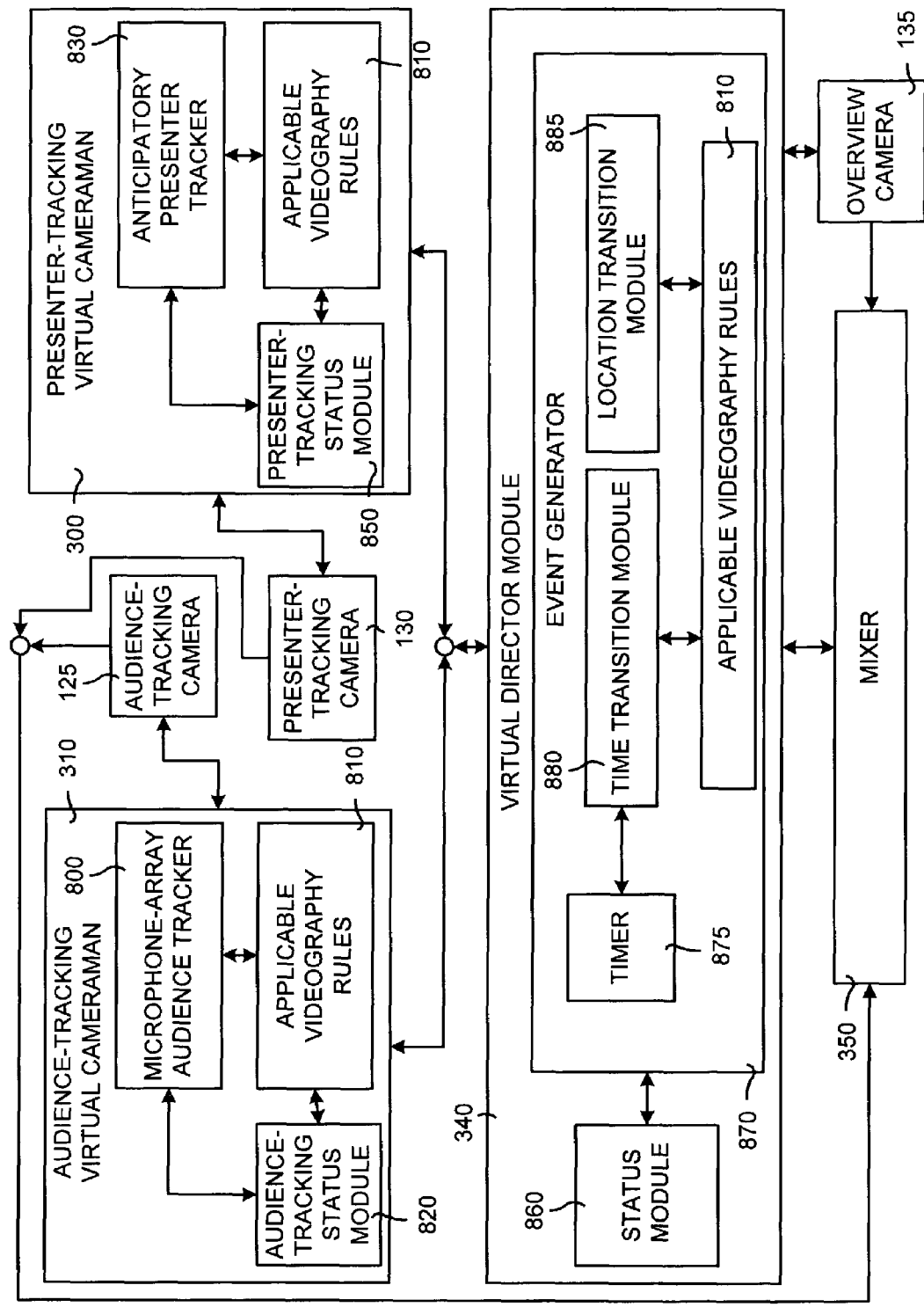
FIG. 8 is a detailed block diagram illustrating the interaction between the audience-tracking virtual cameraman, the presenter-tracking virtual cameraman, the virtual director and the mixer shown in FIG. 3.

FIG. 8 is a detailed block diagram illustrating the interaction between the audience-tracking cameraman 310, the presenter-tracking cameraman 300, the virtual director 340 and the mixer 350 shown in FIG. 3. The audience-tracking cameraman 310 is in communication with the audience-tracking camera 125 of the first A-V camera unit 122 and for providing images of audience members and includes a microphone array audience tracker 800 that controls the audience-tracking camera 125. The audience tracker 800 uses a microphone array (not shown) and applicable videography rules 810 (such as those discussed above) to control the audience-tracking camera 125 and frame each camera view. An audience-tracking status module 820 provides status information to the virtual director 340.

Similarly, the presenter-tracking cameraman 300 is in communication with the presenter-tracking camera 130 for providing images of the presenter and includes an anticipatory presenter tracker 830 that controls the presenter-tracking camera 130. The videography rules 810 are used by the presenter tracker 830 to control the presenter-tracking camera 130 and a presenter-tracking status module 850 reports the status of the presenter-tracking camera 130 to the virtual director 340.

The presenter-tracking cameraman 300 includes the anticipatory presenter tracker 830. This tracker 830 uses a history of the presenter's activity or motion to anticipate future locations of the presenter and then frames the presenter accordingly. For example, for a presenter with an "active" style, the presenter-tracking cameraman 300 will zoom out to cover the presenter's entire activity area instead of continually chasing the presenter with a tight shot. This greatly reduces camera movement.

In general, the anticipatory presenter tracker 830 does not move once the camera locks and focuses on the presenter. Camera movement only occurs if the presenter moves out of the frame or if the virtual director switches to a different camera. In particular, let $(x_t, y_t)$ be the location of the presenter estimated from the wide-angle camera. According to the anticipatory presenter tracker 830, before the virtual director cuts to the presenter-tracking camera at time t, the presenter-tracking virtual cameraman will pan/tilt the camera such that it locks and focuses on location $(x_t, y_t)$. To determine the zoom level of the camera, presenter-tracking virtual cameraman maintains the trajectory of presenter's location in the past T seconds, $(X,Y)=\{(x_1,y_1), \ldots, (x_t,y_t), \ldots, (x_T,y_T)\}$. Currently, T is set to 10 seconds. The bounding box of the activity area in the past T seconds is then given by a rectangle $(X_L, Y_T, X_R, Y_B)$, where they are the left-most, top-most, right-most, and bottom-most points in the set (X,Y). If it is assumed that the presenter's movement is piece-wise stationary, then $(X_L, Y_T, X_R, Y_B)$ is a good estimate of where the presenter will be in the next T' seconds.

The microphone array audience tracker 800 uses a microphone array-based technique to track audience members who are talking. In one embodiment, the type of microphone array-based approach used is the sound source localization (SSL) technique described in detail above. The SSL approach uses correlation techniques to find the time difference between an audio signal arriving at two microphones. From the time difference and microphone array's geometry, the sound source location can be estimated.

The audience-tracking cameraman 310 and the presenter-tracking cameraman 300 send data to the mixer 350 and to the virtual director 340. The mixer 350 receives video data from the virtual cameramen 300, 310 and the overview camera 135. The virtual director 340 receives status and control data from the two virtual cameramen 300, 310 and the overview camera 135. Based on this status and control data, the virtual director 340 determines which of the cameras to use. One purpose of the virtual director 340 is to gather and analyze reports from the cinematographers 300, 310 and to control the mixer 350 to generate the final video based on applicable videography rules 810. The virtual director 340 uses two important components to achieve this goal: a status vector module 660 to maintain the status of each virtual cameraman 300, 310 and an event generator 870. The event generator 870 includes a module that generates a triggering event that triggers a switching from one camera view to another and a finite state machine (FSM) to decide to which camera view to switch.

The event generator 870 includes an internal timer 875 to keep track of how long a particular camera has been on. The event generator 870 is capable of generating two types of triggering events that cause the virtual director module 340 to switch cameras. One type of event is called a "status change" event. A status change event occurs when a status of a virtual cameraman changes. The second type of event is called a "time expire" event. The time expire event occurs if a camera has been on for longer than a predetermined amount of time, as determined by the timer 875. Both the status change triggering event and the time expire triggering event are discussed in detail below.

The event generator 870 determines which of the multiple camera views should be switched to. The event generator 870 includes a time transition module 880, a location transition module 885 and the applicable videography rules 810. In general, the event generator 870 determines switching from one camera to another camera based on a triggering event. The time transition module 880 determines when switching should occur and generates a time expire triggering event. The location transition module 885 determines to which camera the transition should proceed. Both the time transition module 880 and the location transition module 885 follow the applicable videography rules 810 when determining when and where to switch.

Upon receiving a triggering event, the virtual director uses the location transition module 885, which in this case is a multiple state probabilistic finite state machine (FSM), to determine to which camera to switch. In this preferred embodiment, the multiple-state probabilistic finite state machine 885 determines at any given moment which camera to switch to upon receipt of a triggering event.

Communication Between Virtual Cameramen and the Virtual Director

Each of the cameras reports a status to the virtual director 340 through the virtual cameramen. Based on the collected information and history data, the virtual director then decides which camera is chosen as the output camera view manages the camera accordingly. The virtual director also sends its decision back to the virtual cameramen to coordinate further cooperation.

The automated camera management system includes sophisticated rules, called status and command information, which is passed between the virtual cameramen and the virtual director. This status and command information includes a comprehensive set of status and commands. In particular, the virtual cameraman report the following status information to the virtual director:

Mode: Is the camera panning, focusing, static or dead?
Action: Is the camera aborting, waiting, trying, doing or done with an action that the VD requested?
Scene: Is there activity in the scene: is the presenter moving, audience talking, or slide changing?
Score: How good is this shot, e.g., what is the zoom level of the camera?
Confidence: How confident is a VC in a decision; e.g., that a question comes from a particular audience area.

The virtual director sends the following commands to the virtual cameramen:

Mode: Let the camera do a pan, focus, or static shot;
Status: If the virtual cameraman's camera will be selected as preview, on air or off air.

The above status and commands allow the virtual director and the virtual cameramen to exchange information effectively and support the videography rules. For example, the automated camera management system allows a slow pan shot of the audience to be performed, and the duration for which an audience member is focused on is a function of the confidence in the quality of the sound-source localization estimate.

VII. Working Example and User Study Results

The following discussion presents a working example of an implementation of the automated camera management system and method discussed above. This working example is provided for illustrative purposes and is one of several ways in which the invention may be implemented. In addition, results from user study are presented.

The automated video production of the present invention was deployed in a medium presentation room, similar to the presentation room shown in FIG. 1. The presenter 110 normally moves behind the podium 115 and in front of the screen 140. The audience area is in the right-hand side in the figure and includes about 50 seats. The following is a list of the audio-visual hardware used in the system of this working example:

Two Sony EV1-D30 pan/tilt/zoom cameras for capturing lecturer and audience. The EVI camera pans between [−100, +100] degrees, tilts between [−25, +25] degrees, and has a highest zoom level of 12×.

A Super Circuit's PC60XSA camera to monitor presenter's movement. It has a horizontal field of view (FOV) of 74 degrees. A Pelco Spectra II camera for capturing the overview shot. This particular camera was used because it had been already installed in the presentation room before the system was deployed. Alternatively, a low-end video camera could have been used, e.g., a PC60XSA.

Two Super Circuit's PA3 omni-directional microphones used in detecting which audience member is talking.

Panasonic WJ MX50 audio video mixer. This is a low-end mixer that takes in four inputs and is controllable by a computer via RS 232 link.

In order to evaluate the performance of the system it was compared against human videographers. In order to achieve this comparison, the presentation room was restructured so that both the professional videographer and the system had four cameras available. The system and videographers shared the same overview and visual presentation tracking cameras, while each controlled separate presenter-tracking and audience-tracking cameras placed at similar locations. The system and the videographers also used independent video mixers. A series of four one-hour lectures on collaboration technologies given by two researchers was used in the study.

There were two groups of participants: professional videographers and the remote audience watching from their offices. The four professional videographers were recruited from a professional video production company. They are all experienced videographers who have worked in the field for 3-12 years. Each of them recorded one of the four lectures. After a recording, the videographer were interviewed for two hours. First, it was asked what they had done and what rules they usually followed, pressing for details and reviewing some of their video. They then watched and commented on part of the same presentation as captured by our system. They then filled out and discussed answers to a survey covering system quality, as shown in Table 1. Finally, the videographers were asked how they would position and operate cameras in different kinds of rooms and with different levels of equipment, as described above.

In addition, eighteen people watched one or more of the lectures from their offices at their own initiative and filled out the survey described below. The user interface they saw is shown in FIG. 9. The left portion of the user interface is a standard Microsoft MediaPlayer window. The outputs of presenter-tracking camera, audience-tracking camera, and overview camera were first edited by the virtual director and then displayed in this window. The output of the visual presentation tracking camera was displayed to the right. Each presentation was captured simultaneously by a videographer and by the automated camera management system. Remote viewers were told that two videographers, designated A and B (see bottom-left portion of FIG. 9), would alternate every 10 minutes, and were asked to pay attention and rate the two following the presentation.

The results of the user study are presented in Table 1. A scale of between 1 and 5 was used, where 1 is "strongly disagree", 2 is "disagree", 3 is "neutral", 4 is "agree" and 5 is "strongly agree". Because the answers are in ranking order, i.e., 1-5, a WilCoxon test is used to compare different testing conditions. The p-value in the table indicates the probability that the comparison results are due to random variation. For example, if A is better than B with p=0.25, it means that with probability 0.25 that A is better than B is because of random variation in the data. The standard in psychology is that if p is less than 0.05, then the difference is considered significant. The first seven questions in the table relate to individual aspects of presentation-capturing practice, and the last three questions focus on overall presentation-watching experience.

Individual aspects

The professional videographers rated the system quite well for questions 4, 5 and 7 (median ratings of 3.5 to 4.0; see Table 1 for all means). They gave us the highest ratings for Q4 and Q5 relating to capturing audience reactions/questions. In fact, their scores were even higher than those given by the remote audience, among the few exceptions in the whole survey (see Table 1). The professionals said many times that the system found the questioner faster than they did. Q7 related to showing presenter gestures. Both the professionals and the remote audience gave our system high scores of 3.5 and 4.0, respectively. They thought the system's medium-to-close presenter shots caught the gestures well.

The professionals gave the system moderate scores on Q1 (shot change frequency: 2.5) and Q6 (showing facial expressions: 3.0). On shot change frequency, the professionals felt that there was a reasonably wide range based on personal preference, and that the system was within that range. The audience, however, significantly preferred videographers shot change frequency (p=0.01). Some professional videographers did point out that the system's shot change frequency was somewhat mechanical (predictable). For Q6, because the systems' presenter shots were not very tight, they covered the presenter's gestures well (Q7), but were less effective in capturing the presenter's facial expressions (Q6).

The professional videographers gave the system very low scores on Q2 and Q3. They were most sensitive to Q2 on framing. This is where they have spent years perfecting their skills, and they made comments like why was the corner of screen showing in presenter shot. This was recognized by remote audience as well, and they thought the videographers framing was significantly better than the system's framing (p=0.02).

On Q3 (following presenter smoothly) the professional videographers were critical when the system let the presenter get out of the frame a few times and then tried to catch up the presenter again. The remote audience also recognized this, and they thought the videographers' presenter tracking was significantly better than the system's (p=0.01).

Overall Experience

Individual aspects of presentation capturing practice are important, but the overall experience is even more important to the end users. Three overall quality questions were asked. Q8 put less emphasis on aesthetics and asked "The operator did a good job of showing me what I wanted to watch". The professionals gave the system a score of 3.0 and the remote audience gave the system their highest score of 4.0. One of the professionals said "Nobody running the camera . . . this is awesome . . . just the concept is awesome". Another said "It did exactly what it was supposed to do . . . it documented the presenter, it went to the questioner when there was a question".

The second overall question (Q9) had greater emphasis on aesthetics and asked, "Overall, I liked the way the operator controlled the camera". The videographers clearly disagreed with the proposition giving a score of 2.0. In detailed discussion, lack of aesthetic framing, smooth tracking of presenter, and semantically motivated shot cuts were the primary reasons. The remote audience also clearly preferred the overall quality of video from the professionals (p<0.01), while giving the system a neutral score of 3.0.

The third overall question (Q10) focused on how the quality compared to their previous online experiences. The audience thought the quality of both the system and the professionals was equivalent to their previous experiences, giving scores of 3.0. It is interesting to note that although the ratings on the individual aspects of the system were low, the ratings of our system's overall quality were about neutral or higher as judged by the end-users—they never gave a >4.0 score even for professionals. These ratings provide evidence that the system was doing a good job satisfying remote audience's basic presentation-watching need.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for capturing a presentation occurring in a presentation room, comprising:
    determining a number of audio-visual camera units to use in the capture of the presentation;
    determining a type of the presentation room;
    determining applicable videography rules based on the number of audio-visual camera units and the type of presentation room;
    capturing the presentation using the audio-visual camera units;
    determining, setting, and fixing a zoom level of at least one of the audio-visual camera units based on a history of a presenter's movements in the presentation room such that if the presenter moves around the presentation room a great deal then the zoom level is zoomed out more than if the presenter does not move around the presentation room a great deal;
    changing the zoom level only if the presenter moves out of a field-of-view of the audio-visual camera unit; and
    managing the capture of the presentation based on the applicable videography rules and the history of the presenter's movements in the presentation room;
    wherein the applicable videography rules further comprise camera positioning rules that determine a location in the presentation room of the audio-visual camera units;
    wherein the camera positioning rules further comprise positioning a first one of the audio-visual camera units to avoid capture by any other audio-visual camera units.

2. The method as set forth in claim 1, wherein the camera positioning rules further comprise positioning the audio-visual camera units to avoid crossing a line of interest.

3. The method as set forth in claim 1, wherein the camera positioning rules further comprise positioning the audio-visual camera units to capture a target in one of the following ways: (a) straight on with the target; (b) at a slight angle with the target.

4. The method as set forth in claim 1, further comprising:
providing a presenter-tracking camera for capturing a presenter; and
providing an overview camera for capturing an overview of the presentation room.

5. The method as set forth in claim 4, wherein the camera positioning rules further comprise positioning the presenter-tracking camera and overview camera approximately at eye-level.

6. The method as set forth in claim 5, wherein the camera positioning rules further comprise positioning the presenter-tracking camera and overview camera such that obstructions from an audience are avoided.

7. The method as set forth in claim 1, wherein the applicable videography rules further comprise camera movement rules that determine the movement of the audio-visual camera units.

8. The method as set forth in claim 7, wherein the camera movement rules further comprise presenter tracking and framing rules for determining how to move the audio-visual camera units to frame and track a presenter in the presentation room.

9. The method as set forth in claim 8, wherein the presenter tracking and framing rules further comprise keeping a head shot with proper space above a head of the presenter.

10. The method as set forth in claim 9, wherein the head shot is one of: (a) a tight head shot; (b) a medium head shot.

11. The method as set forth in claim 9, wherein the proper space above the head of the presenter is one-half of a height of the head of the presenter.

12. The method as set forth in claim 8, wherein the presenter tracking and framing rules further comprise:
centering the presenter a majority of the time; and
giving lead room for the presenter's gaze based on at least one of: (a) a gaze direction of the presenter; (b) a head orientation of the presenter.

13. The method as set forth in claim 8, wherein the presenter tracking and framing rules further comprise tracking the presenter.

14. The method as set forth in claim 8, wherein at least one of the audio-visual camera units is a presenter-tracking camera, and wherein the presenter tracking and framing rules further comprise restricting the movement of the presenter-tracking camera to when the presenter moves outside a specified zone.

15. The method as set forth in claim 7, wherein the camera movement rules further comprise audience tracking and framing rules for determining how to move the audio-visual camera units to frame and track audience members in the presentation room.

16. The method as set forth in claim 15, wherein the audience tracking and framing rules further comprise promptly showing an audience member that has done at least one of: (a) asking a question; (b) making a comment.

17. The method as set forth in claim 16, wherein the audience tracking and framing rules further comprise showing a wide shot of the audience if the audience member cannot be located.

18. The method as set forth in claim 16, wherein the audience tracking and framing rules further comprise remaining with a presenter if the audience member cannot be located.

19. The method as set forth in claim 15, wherein the audience tracking and framing rules further comprise avoiding shots showing few audience members relative to a size of the presentation room.

20. The method as set forth in claim 15, wherein the audience tracking and framing rules further comprise occasionally showing audience members for several seconds.

21. The method as set forth in claim 1, wherein the applicable videography rules further comprise shot transition rules that determine how and when switching between the audio-visual camera units should occur.

22. The method as set forth in claim 21, wherein the shot transition rules further comprise maintaining frequent and random shot changes to avoid making the shot changes mechanical and predictable.

23. The method as set forth in claim 21, wherein the shot transition rules further comprise maintaining a shot longer than a minimum shot duration to avoid distracting viewers.

24. The method as set forth in claim 23, wherein the minimum shot duration is between from three seconds to five seconds.

25. The method as set forth in claim 21, wherein the shot transition rules further comprise maintaining a shot for no longer than a maximum shot duration.

26. The method as set forth in claim 25, wherein the maximum shot duration is dependent on the type camera used in the audio-visual camera units.

27. The method as set forth in claim 21, wherein the shot transition rules further comprise switching shots when motivated by at least one of: (a) shot duration; (b) an event.

28. The method as set forth in claim 21, wherein the shot transition rules further comprise switching shots when a presenter has finished a concept.

29. The method as set forth in claim 21, wherein the shot transition rules further comprise switching shots when an audience member has finished asking a question.

30. A method for capturing a presentation, comprising:
providing at least one audio-visual camera unit that includes a presenter-tracking camera;
positioning and moving the audio-visual camera units based on videography rules;
focusing the presenter-tracking camera on a presenter's current location in a presentation room;
maintaining a trajectory of the presenter's location in the presentation room during a previous time period and designating the trajectory during the time period as an activity area;
defining a bounding box as a rectangle containing the activity area;
determining, setting, and fixing a zoom level of the presenter-tracking camera based on a history of the presenter's movements such that if the presenter moves around the presentation room a great deal then the zoom level is zoomed out more than if the presenter does not move around the presentation room a great deal and such that the entire activity area is captured to frame the presenter with the presenter-tracking camera within the bounding box, determining the zoom level, $Z_L$, further comprising using the equation:

$$Z_L = \min\left(\frac{HFOV}{\angle(X_R, X_L)}, \frac{VFOV}{\angle(Y_B, Y_T)}\right),$$

where HFOV is the horizontal field of view of the presenter-tracking camera, VFOV is the vertical field of view of the presenter-tracking camera, and $\angle$ represents an angle spanned by the two arguments in a coordinate system of the presenter-tracking camera;

changing the zoom level only if the presenter moves out of a field-of-view of the audio-visual camera unit; and automatically capturing the presentation using the at least one audio-visual camera unit and the videography rules;

wherein the videography rules are based on a type of presentation room in which the presentation occurs and the type of presentation room is a large presentation room;

wherein the audio-visual camera unit further comprises a presenter-tracking camera and the videography rules further comprise positioning the presenter-tracking camera higher from a floor in the large presentation room relative to a position of the presenter-tracking camera in a medium presentation room.

31. The method as set forth in claim 30, wherein the videography rules are based on a number of audio-visual camera units used to automatically capture the presentation.

32. The method as set forth in claim 31, wherein:
there is a plurality of audio-visual camera units;
at least one of the plurality of audio-visual camera units contains a plurality of cameras; and
switching between cameras is based on the videography rules.

33. A computer-readable medium having computer-executable instructions for managing capture of a presentation in a presentation room comprising:
determining videography rules for managing the capture based on the type of presentation room;
positioning two audio-visual camera units based on the videography rules;
determining a history of a presenter's movement in the presentation room and using the history to determine a framing of the presenter based on the videography rules; and
determining a zoom level of at least one of the two audio-visual camera units based on the history of the presenter's movements such that an entire activity area of the presenter is captured;
determining a location of an audience member in an audience of the presentation room by using a sound source localization technigue that uses a hybrid weighting function, the hybrid weighting function defined as:

$$W(\omega) = \frac{1}{\gamma |G_{x_1 x_2}(\omega)| + (1-\gamma)|N(\omega)|^2},$$

where $\gamma \in [0,1]$ is a proportion factor and, $|N'(\omega)|^2 = |H(\omega)|^2 |S(\omega)|^2 + |N(\omega)|^2.$ 34. The computer-readable medium as set forth in claim 33, wherein the type of presentation room is a medium presentation room.

35. The computer-readable medium as set forth in claim 33, wherein the type of presentation room is a large presentation room.

36. The computer-readable medium as set forth in claim 33, wherein the type of presentation room is a small presentation room.

37. A method for automatically capturing a presentation in a presentation room, comprising:
determining videography rules for the capture based on the type of presentation room;
positioning three audio-visual camera units based on the videography rules using a virtual cameraman to control the audio-visual camera units;
determining a history of a presenter's movement in the presentation room;
framing shots of the presenter from at least one of the audio-visual camera units based on the history and the videography rules; and
determining a zoom level of at least one of the three audio-visual camera units based on the history of the presenter's movements such that an entire activity area of the presenter is captured;
using a virtual director to select and determine which of the audio-visual camera units is an active camera;
using the virtual cameramen to report a status to the virtual director, the status further comprising the following commands: (a) mode status; (b) action status; (c) scene status; (d) score status; (e) confidence status.

38. A method for capturing a moving presenter giving a presentation in a presentation room, comprising:
determining applicable videography rules for managing the capture of the presentation;
determining a history of the presenter's movement; and
positioning two audio-visual camera units based on the videography rules using a virtual cameraman; and
determining, setting, and fixing a zoom level of at least one of the two audio-visual camera units based on the history of the presenter's movements such that an entire activity area of the presenter is captured, such that if the presenter moves around the presentation room a great deal then the zoom level is zoomed out more than if the presenter does not move around the presentation room a great deal;
changing the zoom level only if the presenter moves out of a field-of-view of any one of the two audio-visual camera units;
using a virtual director to select and determine which of the audio-visual camera units is an active camera;
using the virtual cameramen to report a status to the virtual director, the status further comprising the following commands: (a) mode status; (b) action status; (c) scene status; (d) score status; (e) confidence status.

* * * * *